United States Patent [19]

Rylatt

[11] Patent Number: 4,938,919
[45] Date of Patent: Jul. 3, 1990

[54] HOLD-DOWN SPRING CLAMPS ON FUEL ASSEMBLY TOP NOZZLE

[75] Inventor: John A. Rylatt, Columbia, S.C.

[73] Assignee: Westinghouse Electric Corp., Pittsburgh, Pa.

[21] Appl. No.: 319,590

[22] Filed: Mar. 6, 1989

[51] Int. Cl.⁵ .................................................. G21C 3/30
[52] U.S. Cl. ...................... 376/446; 376/364; 411/393; 411/424; 403/362
[58] Field of Search ............... 376/364, 434, 446, 445; 411/389, 393, 411, 412, 424; 403/362

[56] References Cited

U.S. PATENT DOCUMENTS

| | | | |
|---|---|---|---|
| Re. 31,583 | 5/1984 | Klumb et al. | 376/364 |
| 2,354,160 | 7/1944 | Wallgren | 411/393 |
| 3,791,466 | 2/1974 | Patterson et al. | 376/442 |
| 3,814,667 | 6/1974 | Klumb et al. | 376/364 |
| 4,072,562 | 2/1978 | Sankovich | 376/364 |
| 4,420,457 | 12/1983 | Le Pargneux | 376/446 |
| 4,551,300 | 11/1985 | Feutkel | 376/364 |
| 4,645,642 | 2/1987 | Leclekq et al. | 376/364 |
| 4,671,924 | 6/1987 | Gjersten et al. | 376/285 |
| 4,684,502 | 8/1987 | Wilson et al. | 376/446 |
| 4,792,429 | 12/1988 | Hatfield | 376/446 |

FOREIGN PATENT DOCUMENTS

| | | | |
|---|---|---|---|
| 0084480 | 7/1983 | European Pat. Off. | |
| 0123607 | 10/1984 | European Pat. Off. | |
| 0212902 | 3/1987 | European Pat. Off. | |
| 62-91891 | 4/1987 | Japan | 376/446 |
| 62-102186 | 5/1987 | Japan | 376/446 |

*Primary Examiner*—Daniel D. Wasil

[57] ABSTRACT

A fuel assembly has a top nozzle with improved clamps for retaining hold-down spring assemblies. Each clamp includes a clamp block formed integral with a flange of the top nozzle at each of a pair of diagonal corners thereof. Each clamp block has a pair of interconnected clamp slots formed therein. Each clamp slot is formed in the clamp block with interconnected openings at the front and outer side thereof. The front and outer side openings permit sideways insertion of the hold-down spring assembly at a base end thereof to position the spring assembly for attachment to the top nozzle. The clamp slot also provides a flat bottom surface in the clamp block for clamping the hold-down spring assembly.

6 Claims, 7 Drawing Sheets

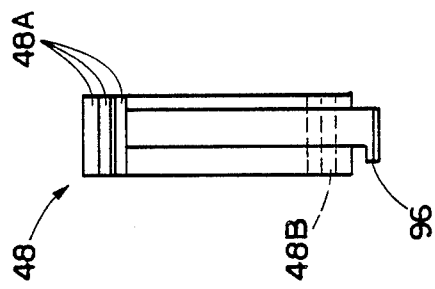
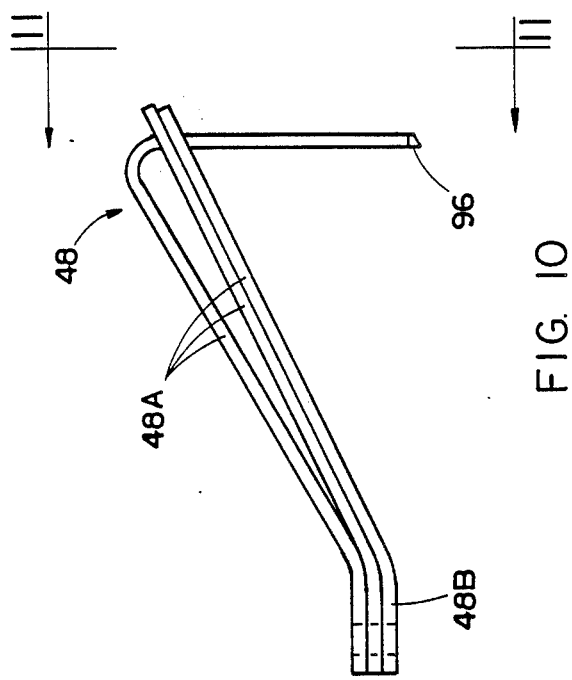

HOLD-DOWN SPRING CLAMPS ON FUEL ASSEMBLY TOP NOZZLE

BACKGROUND OF THE INVENTION

1. Field of the Invention

The present invention relates generally to fuel assemblies for a nuclear reactor and, more particularly, is concerned with improved hold-down spring clamps on the top nozzle of the fuel assembly and a method of installing the hold-down springs.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle.

In the conventional fuel assembly, coolant flowing upward past the fuel rods and guide thimbles induces significant upward forces. These forces are countered by a combination of the weight of the fuel assembly and a plurality of hold-down spring assemblies of a hold-down device which push against the upper core plate of the reactor. The hold-down spring assemblies thereby prevent the force of the upward coolant flow from lifting the fuel assembly into damaging contact with the upper core plate, while allowing for changes in fuel assembly length due to core induced thermal expansion and the like.

Heretofore, the hold-down spring assemblies of the hold-down device have been fastened and held in their operative positions on the top nozzle by using several clamps in the form of corner blocks separate from the top nozzle and a number of screws which extend through the corner blocks and bases of the spring assemblies and together with the corner blocks clamp the spring assemblies at their respective bases to a peripheral top flange of the top nozzle. In their operative positions, the spring assemblies extend in inclined upward relationships along and within the outer perimeter of the top nozzle enclosure where they contact the upper core plate.

More particularly, each hold-down spring assembly of the hold-down device is attached to the fuel assembly at the top nozzle by a single spring screw. The screws are located such that for four hold-down spring assemblies, two pairs of spring screws are located at the opposite corners of the top nozzle. The corner clamp block with recessed holes defined in it sits over each pair of spring screws and acts as a protective cover for the heads of the spring screws. As shown in U.S. Pat. No. 3,791,466 to Patterson et al. and assigned to the assignee of the present invention, each corner clamp block is attached to the top nozzle by welding and/or a single clamp screw. As shown in pending U.S. patent application entitled "Method of Removing and Replacing Locking Screws in a Nuclear Fuel Assembly" by John M. Shallenberger et al., filed July 29, 1987, Ser. No. 079,208 (W.E. 52,786I) and assigned to the assignee of the present invention, each spring screw is locked against rotation and is retained in place by a lock pin which is welded to the inside of the screw head clearance hole in the clamp block.

There have been a few known occasions when the head of a spring screw has broken off. Problems can result on such occasions when both screws fail at a single clamp location. The leverage forces exerted by the now unclamped hold-down spring assemblies can cause the clamp block-to-nozzle welds to fail. The result of such a failure is that both the clamp block and spring screw heads are now unrestrained and free to move in the coolant flow and the spring assemblies free to pivot about relative to the top nozzle. Such unrestrained spring assemblies are likely to interfere with the operation of the control rod assemblies.

Consequently, a need exists for improvements in the manner in which the hold-down spring assemblies are retained on the top nozzle.

SUMMARY OF THE INVENTION

The present invention provides an improved hold-down spring clamp designed to satisfy the aforementioned needs. In the unlikely event a spring screw fails under its head, leverage forces on the portion of the clamp integral with the top nozzle are resisted by the adequate tensile area of such portion of the clamp such that the clamp will not separate from the top nozzle. With the clamp remaining integral, the spring screw head and hold-down spring assemblies are fully retained.

Accordingly, the present invention is directed to an improved spring clamp on a fuel assembly top nozzle for retaining a hold-down spring assembly. The improved clamp comprises a clamp block formed integral with a top portion of the top nozzle at each of a pair of diagonal corners thereof. Each clamp block has a pair of interconnected clamp slots formed therein. Each clamp slot is formed in the clamp block with interconnected openings at the front and outer side thereof. The front and outer side openings permit sideways insertion of the hold-down spring assembly at a base end thereof to position the spring assembly for attachment to the top nozzle. The clamp slot also provides a flat bottom surface in the clamp block for clamping the hold-down spring assembly.

The present invention also is directed to a method of installing the hold-down spring assembly. The installing method comprises the steps of: (a) orienting the spring assembly at an angle, such as orthogonally, to a spring slot in a top portion of the top nozzle; (b) inserting an offset anchor member on one end of the spring assembly into the spring slot; (c) pivoting the spring assembly along a path generally parallel to the top nozzle and about its anchor member to bring an opposite base end of the spring assembly adjacent to a side opening of a clamp slot in a clamp block integrally formed on the top nozzle; (d) inserting the spring assembly base end sideways into the clamp slot through the side opening and a front opening of the clamp slot interconnected therewith; and (e) installing and fastening a fastener through a hole in a top portion of the integral clamp block above the clamp slot, through a hole in the spring assembly base, and into a hole in the top portion of the top nozzle. Also, a lock pin can be installed in a slot defined across the head of the fastener and attached at its opposite ends to the inside surface of the hole in the top portion of the clamp block to restrain the fastener against rotation and thereby retain the fastener in its installed condition.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 10 is a side elevational view of the hold-down spring assembly.

FIG. 11 is an end elevational view of the hold-down spring assembly as seen along line 11—11 of FIG. 10.

DETAILED DESCRIPTION OF THE INVENTION

Figure 1:
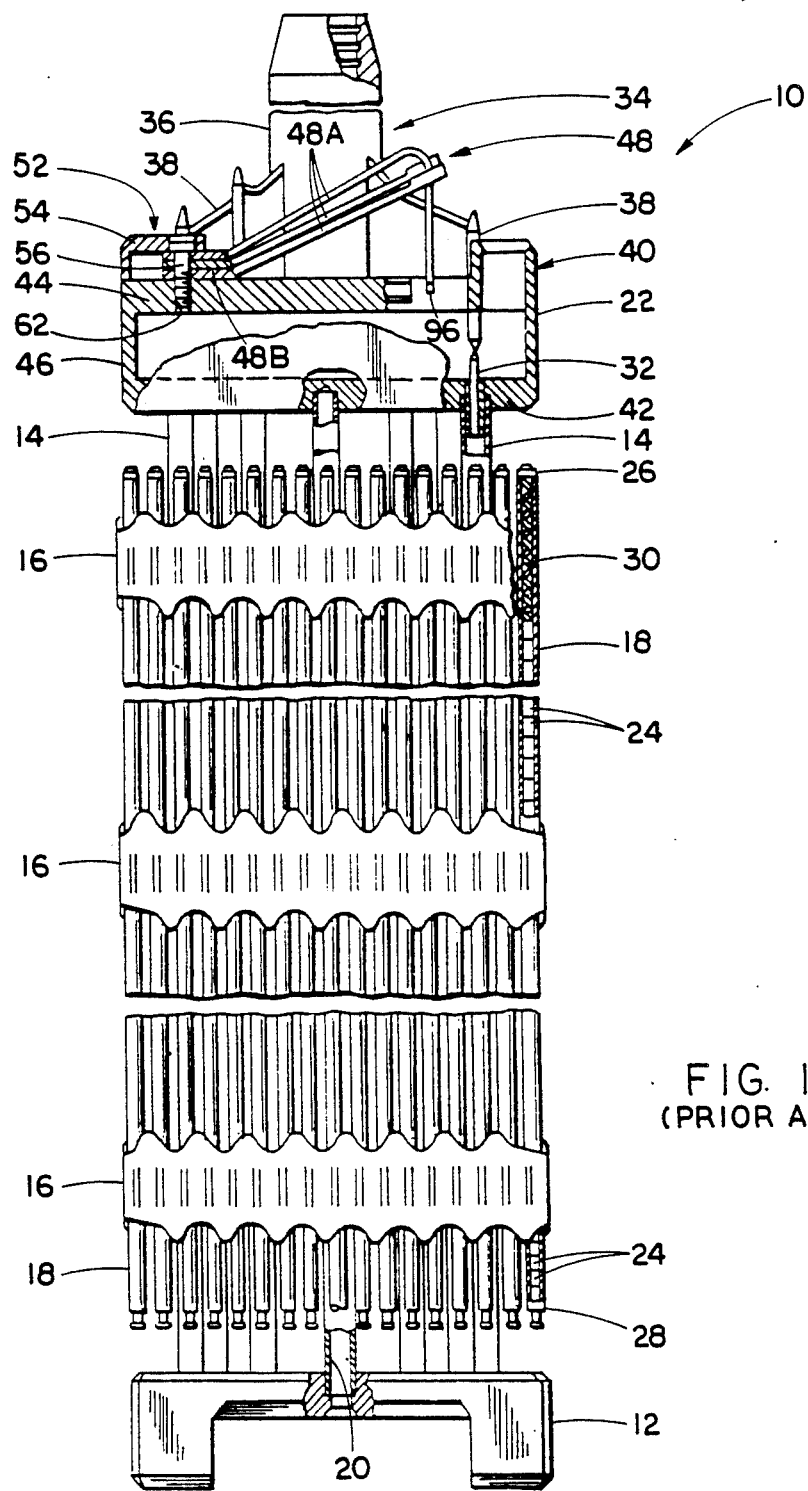
FIG. 1 is an elevational view, partly in section, of a prior art fuel assembly in which an improved hold-down spring clamp of the present invention is intended to be employed, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically or longitudinally foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally grooved cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Figure 2:
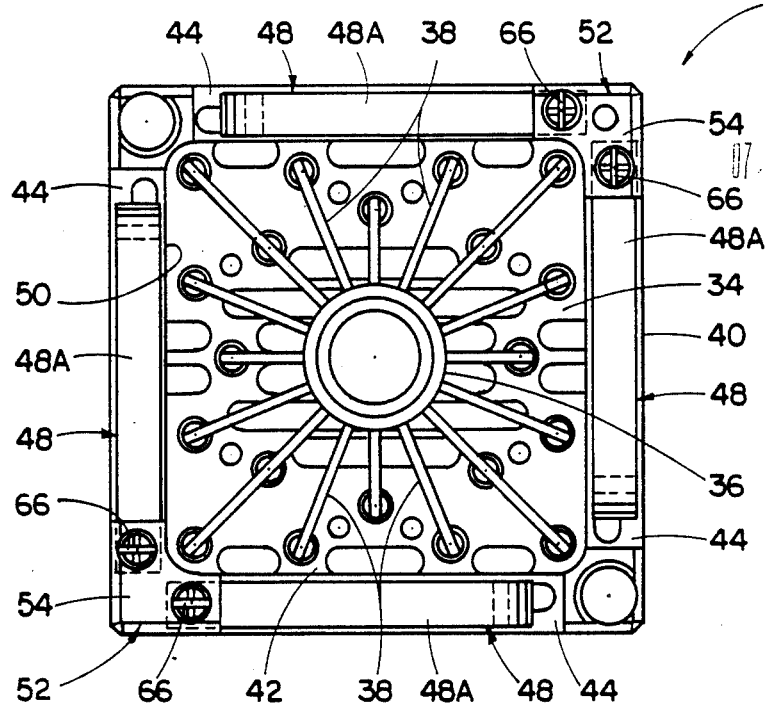
FIG. 2 is an enlarged top plan view of the fuel assembly as seen along line 2—2 of FIG. 1, showing the top nozzle with prior art separate hold-down spring clamps attached thereon.

Referring now to FIG. 2 as well as FIG. 1, it can be seen that the top nozzle 22 includes an enclosure or housing 40 formed by a transversely extending lower adapter plate 42 and an upper annular flange 44 with an upstanding sidewall 46 extending between and integrally interconnecting the adapter plate and flange at their respective peripheries. Suitably clamped to the annular flange 44 are a plurality of spring assemblies 48 which constitute a hold-down device for the fuel assembly 10. Each spring assembly 48 is composed of a set of leaf springs 48A disposed in a stack relation. The spring assemblies 48 cooperate with the upper core plate (not shown) in a conventional manner to prevent hydraulic lifting of the fuel assembly 10 caused by upward coolant flow while allowing for changes in fuel assembly length due to core induced thermal expansion and the like. Also, the rod cluster control assembly 34 is disposed within a central top opening 50 of the top nozzle 22 defined by the annular flange 44.

Figure 3:
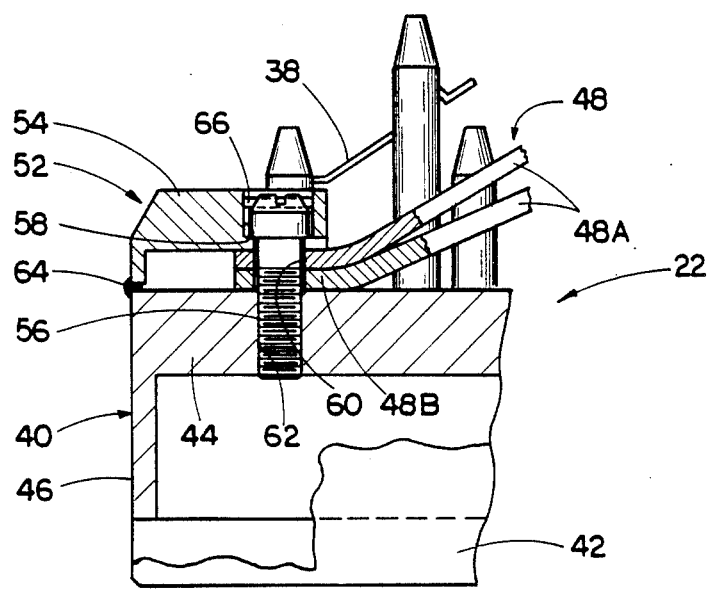
FIG. 3 is an enlarged fragmentary view of the upper left hand corner of the top nozzle of FIG. 1, showing the prior art separate hold-down spring clamp.

As seen in FIGS. 1 and 2, and more clearly in FIG. 3, each spring assembly 48 at a base end 48B is fastened and held in its operative position on the top nozzle upper flange 44 by using a spring clamp 52 which includes a corner block 54 and a spring screw 56. There are two spring clamps 52 for holding two pairs of the spring assemblies 48. One spring clamp 52 is provided at each of a pair of opposite diagonal corners of the top nozzle 22 and each spring clamp 52 preferably includes the one clamp block 54 and a pair of spring screws 56 which share the same clamp block for clamping a pair of the spring assemblies 48 at their respective base ends 48B. Each screw 56 is installed through a counterbore 58 defined in the corner block 54 and a hole 60 defined in the base end 48B of the spring assembly 48. The screw 56 is threaded into a threaded hole 62 tapped in the upper annular flange 44. Together with the corner clamp block 54, when the spring screw 56 is tightened down it clamps the spring assembly 48 at its respective base end 48B to the peripheral upper annular flange 44 of the top nozzle 22. Once the screw 56 is tightened down, the corner clamp block 54 is then fixedly attached to the top nozzle flange 44 by welds 64. Further, the spring screw 56 is locked against rotation and is retained in place by a lock pin 66 which is welded to the inside of the counterbore 58 in the clamp block 54. In their operative positions, the spring assemblies 48 extend in inclined upward relationship along and within the outer perimeter of the top nozzle housing 40 where they contact the upper core plate.

One drawback of the spring clamp 52 is that if both screws 56 fail at a single clamp location, then the leverage forces being exerted by the now unclamped pair of spring assemblies 48 can cause the clamp block-to-nozzle welds 64 to fail. The result of such a failure is that both the clamp block and spring screw heads are now unrestrained and free to be carried away in the coolant flow and the spring assemblies free to pivot relative to the top nozzle. Such unrestrained spring assemblies are likely to interfere with the operation of the control rod assemblies.

Improved Hold-Down Spring Clamps of the Present Invention

Referring now to FIGS. 4–9, there is illustrated a pair of improved spring clamps 68, being constructed in accordance with the present invention, which overcome the above-described drawback and retain the spring assemblies 48 on the top nozzle 22 in an improved manner. Except for the construction and configuration of the improved spring clamps 68 and the location of spring slots 70 defined in the top nozzle flange 44, the top nozzle 22 is substantially the same as shown in FIGS. 1–3. Therefore, the same reference numerals are used to identify the same parts.

Each of the improved spring clamps 68 includes a clamp block 72 and a pair of fasteners 74 associated with the clamp block 72. The clamp block 72 of each improved spring clamp 68 is formed integrally with the top portion or flange 44 of the top nozzle 22 at each of one pair of diagonal corners of the top nozzle. Each clamp block 72 has a pair of interconnected clamp slots 76 formed therein, such as by machining, for insertion of the base ends 48B of one of the two pairs of spring assemblies 48 shown in FIGS. 10 and 11. Each clamp slot 76 is formed in the clamp block 72 with interconnected openings 78, 80 at front and outer side thereof. The front opening 78 is aligned with the top nozzle flange 44, whereas the outer side opening 80 is at the outer side of the top nozzle flange. Each clamp slot 76 is closed at its inner side adjacent the inner side of the top nozzle flange and closed by a corner solid portion 82 of the integral clamp block 72. A common rear corner opening 84 is defined within the clamp block 72 which interconnects the pair of clamp slots 76 defined in the block. The front and outer side openings 78, 80 of each clamp slot 76 permit sideways insertion of the base end 48b of one spring assembly 48 to position the spring assembly 48 for attachment to the top nozzle 22.

The pair of fasteners 74 of each improved spring clamp 68 being associated with the one clamp block 72 thereof are used for attaching one of the two pairs of spring assemblies 48 to the top nozzle flange 44. The clamp block 72 has a pair of spaced bores 86 defined therethrough, each bore being aligned with one of the clamp slots 76 and with a hole 88 in the flange 44 of the top nozzle 22. Each fastener 74 is provided in the form of a screw having a threaded stem 90 and a head 92 for installing and fastening through the clamp block bore 86, through the hole 60 in spring assembly base end 48B when inserted in the clamp slot 76, and into the hole 88 in the top nozzle flange 44. In the embodiment of FIG. 3, the flange hole 88 is internally threaded for receiving the threaded stem 90 of the screw fastener 74. The head 92 of the fastener 74 thus clamps the base end 48B of the spring assembly 48 against a flat bottom surface 94 provided in the clamp block slot 76 on the top nozzle flange 44.

Figure 12:
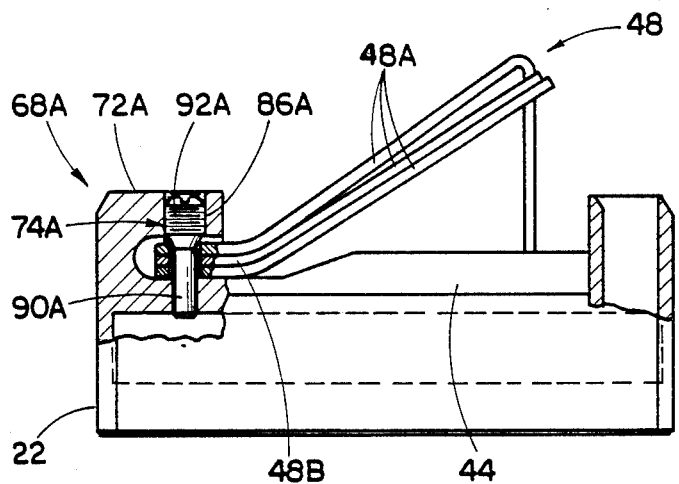
FIG. 12 is a view similar to FIG. 9 of an alternative embodiment of the improved hold-down spring clamp of the present invention.

In FIG. 12, an alternative embodiment of the spring clamp 68A is shown. In this embodiment, each of the bore 86A in the clamp block 72A is internally threaded. Instead of the stem 90A of the fastener 74A being threaded, its head 92A is externally threaded for threading with the internally threaded bore 86A of the clamp block 72A. In this embodiment, the fastener head 92A pushes down on the base end 48B of the spring assembly 48, instead of "pulling" it down as in the earlier embodiment.

Figure 4:
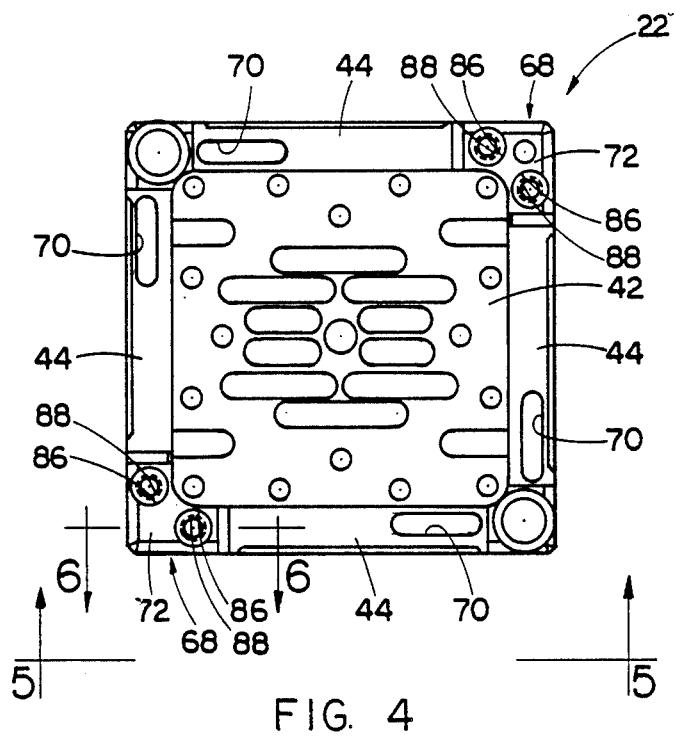
FIG. 4 is an enlarged top plan view of a fuel assembly similar to that of FIG. 1, showing the top nozzle without hold-down spring assemblies applied thereon but with the improved hold-down spring clamps of the present invention.
Figure 5:
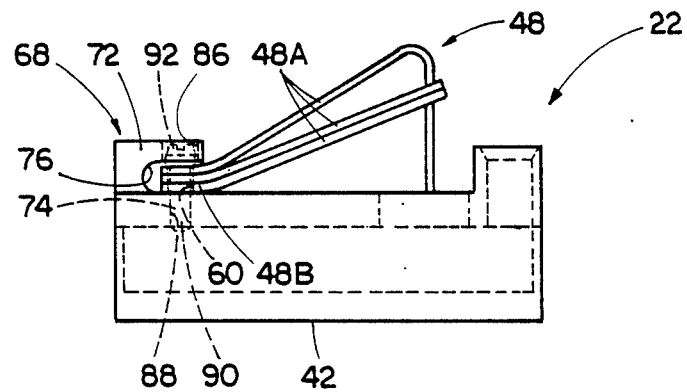
FIG. 5 is a side elevational view of the top nozzle as seen along line 5—5 of FIG. 4.
Figure 6:
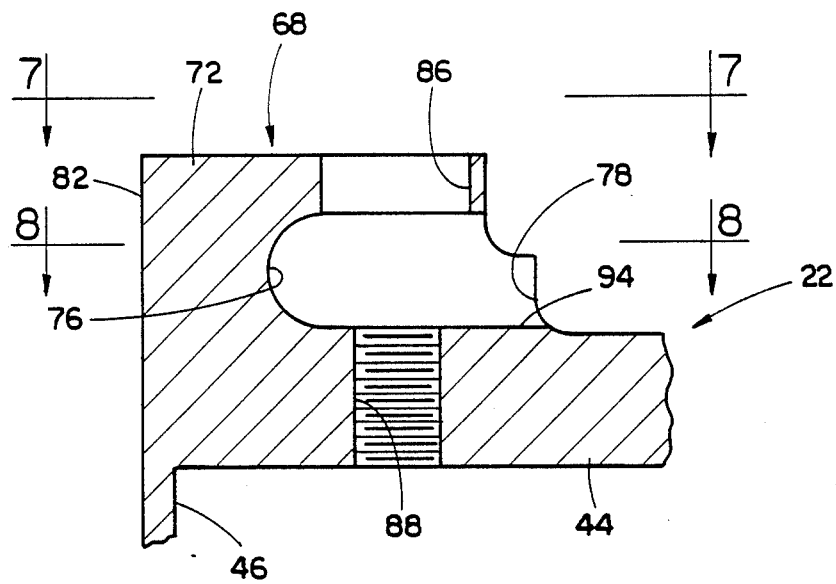
FIG. 6 is an enlarged fragmentary cross-sectional view of the top nozzle taken along line 6—6 of FIG. 4.
Figure 9:
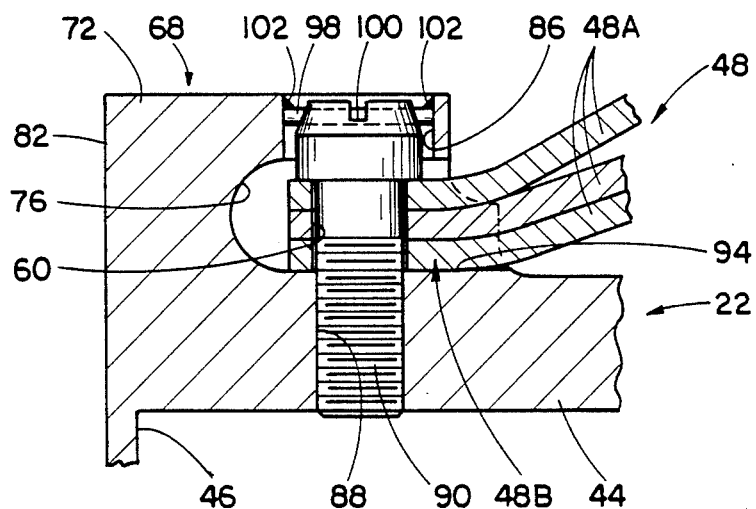
FIG. 9 is a view similar to FIG. 6 showing a base end of a hold-down spring assembly installed under the improved hold-down spring clamp of the present invention.
Figure 7:
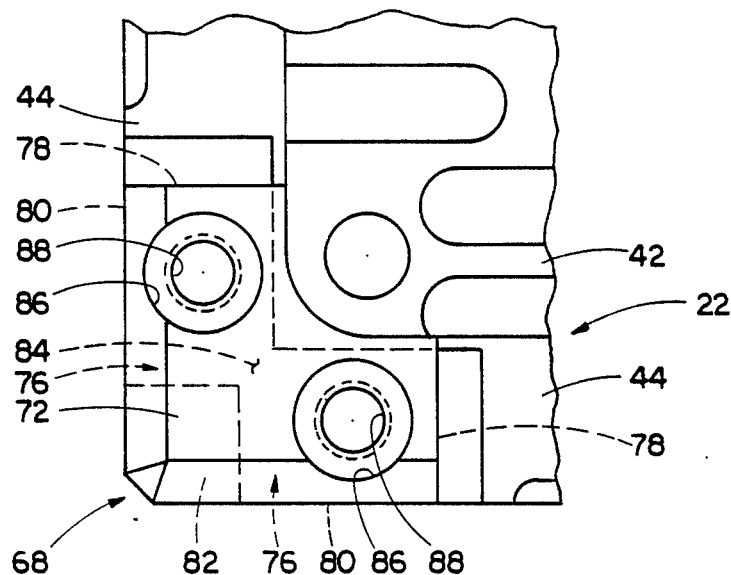
FIG. 7 is a top plan view of the top nozzle as seen along line 7—7 of FIG. 6.
Figure 8:
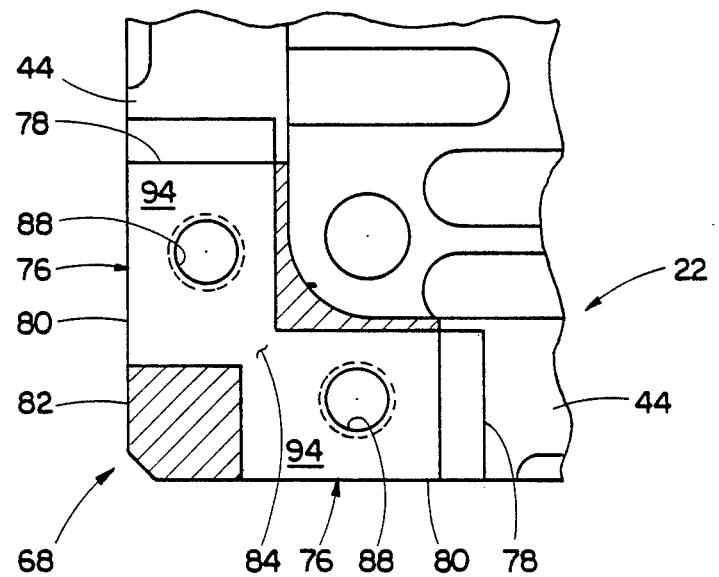
FIG. 8 is a cross-sectional view of the top nozzle taken along line 8—8 of FIG. 6.

It should be understood that each clamp slot 76 in the clamp blocks 72 can be formed at a preselected angle relative to the plane of the top nozzle flange 44 for customizing the spring force of the spring assembly 48 to the hydraulic and static force balance requirements of the hold-down device. Also, it should be noted that on the top nozzle flange 44 as seen in FIG. 4, the placements of some of the spring slots 70 have been relocated such that left-hand and right-hand configurations of the spring assemblies 48 are no longer required. Only a single-hand spring assembly 48 is used, as seen in FIGS. 10 and 11, making inventory accounting easier.

The integral feature of each improved spring clamp 68 results in a unique method by which each hold-down spring assembly 48 is installed on the top nozzle 22. First, the spring assembly 48 is oriented at an angle, such as orthogonally, to one of the elongated spring slot 70 defined in flange 44 of the top nozzle 22. Next, an offset tang or anchor member 96 on the forward end of the spring assembly 48 is inserted into the spring slot 70. The offset member 96 cannot be inserted into or removed from the spring slot 70 except at such orientation of the spring assembly 48. Following next, the spring assembly 48 is pivotally moved along a path generally parallel to the top nozzle 22 and about its anchor member 96 to bring its opposite base end 48B adjacent to the outer side opening 80 of the clamp block slot 76. In such alignment, the spring assembly base end 48B can then be inserted sideways into the clamp slot 76 through the side and front openings 80, 78. Then, the fastener 74 is installed through the bore 86 in the integral clamp block 72 above the clamp slot 76, through the hole 60 in the spring assembly base end 48B, and into the threaded hole 88 in the top nozzle flange 44. Finally, a lock pin 98 can be installed in a slot 100 defined across the fastener head 92 and attached by welds 102 at its opposite ends to the inside surface of the bore 86 in the clamp block 72 to restrain the fastener 74 against rotation and thereby retain the fastener in its installed condition.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a fuel assembly having a top nozzle and a holddown device including at least one spring assembly mounted on said top nozzle and having a base end with a hole therethrough alignable with a hole in said top nozzle, an improved spring clamp assembly on said top nozzle for retaining said spring assembly thereon, said improved clamp assembly comprising:
   (a) a clamp block formed integrally with said top nozzle and having a clamp slot formed therein for insertion of said spring assembly at said base end thereof and an internally threaded bore formed therein which is disposed above and intersects with said clamp slot and is aligned with said hole in said top nozzle being disposed below said clamp slot;
   (b) said clamp slot being formed in said clamp block with interconnected openings at front and outer sides thereof, said front and outer side openings permitting sideways insertion of said spring assembly at said base end thereof to position said spring assembly for attachment to said top nozzle; and
   (c) a fastener for installing and fastening through said bore defined in said clamp block, through said hole in said spring assembly at said base end thereof when inserted in said clamp slot, and into said hole in said top nozzle;
   (d) said fastener having an end being in said hole in said top nozzle and an externally threaded head spaced from said end and being threadable within said internally threaded bore of said clamp block for fastening and clamping said spring assembly at said base end thereof between said clamp block and said top nozzle.

2. The fuel assembly as recited in claim 1, wherein said clamp slot provides a flat bottom surface in said clamp block for clamping said spring assembly.

3. The fuel assembly as recited in claim 1, wherein said clamp includes a pair of said clamp blocks, each clamp block being formed integrally with said top nozzle at each of a pair of diagonal corners thereof.

4. The fuel assembly a s recited in claim 1, wherein each said clamp block has a pair of interconnected clamp slots formed therein for receiving base ends of a pair of said spring assemblies.

5. In a fuel assembly having a top nozzle and a holddown device including a plurality of spring assemblies mounted on said top nozzle and having base ends with holes therethrough alignable with holes in said top nozzle, a pair of improved spring clamp assemblies on said top nozzle for retaining said spring assemblies thereon, each of said improved clamp assemblies comprising:
   (a) a clamp block formed integrally with a top portion of said top nozzle at each of a pair of diagonal corners thereof;
   (b) said clamp block having a pair of interconnected clamp slots formed therein for insertion of a pair of said spring assemblies of said base ends thereof and a pair of internally threaded bores formed therein which are disposed above and intersects with respective ones of said clamp slots and are aligned with respective ones of said holes in said top nozzle being disposed below said respective ones of said clamp slots;
   (c) each clamp slot being formed in said clamp block with interconnected openings at front and outer sides thereof, said front and outer side openings permitting sideways insertion of one of said spring assemblies at said base end thereof to position said one spring assembly for attachment to said top nozzle; and
   (d) a pair of fasteners each for installing and fastening through one of said bores defined in said clamp block in alignment with one of said clamp slots, through said hole in one of said spring assemblies at said base end thereof when inserted in said one clamp slot, and into one of said holes in said top nozzle;
   (e) said each fastener having an end being in said one hole in said top nozzle and an externally threaded head spaced from said end and being threadable within said one internally threaded bore of said clamp block for fastening and clamping said one spring assembly at said base end thereof between said clamp block and said top nozzle.

6. The fuel assembly as recited in claim 5, wherein each of said clamp slots provides a flat bottom surface in said clamp blocks for clamping said one of said spring assemblies.

* * * * *